(12) United States Patent
Hong

(10) Patent No.: US 11,575,159 B2
(45) Date of Patent: Feb. 7, 2023

(54) WIRELESS BATTERY SYSTEM, METHOD OF OPERATING WIRELESS BATTERY SYSTEM, AND ROBOT WITH APPLICATION OF WIRELESS BATTERY SYSTEM

(71) Applicant: LG ELECTRONICS INC., Seoul (KR)

(72) Inventor: Subong Hong, Seoul (KR)

(73) Assignee: LG ELECTRONICS INC., Seoul (KR)

( * ) Notice: Subject to any disclaimer, the term of this patent is extended or adjusted under 35 U.S.C. 154(b) by 358 days.

(21) Appl. No.: 16/824,066

(22) Filed: Mar. 19, 2020

(65) Prior Publication Data

US 2021/0135293 A1    May 6, 2021

(30) Foreign Application Priority Data

Oct. 31, 2019 (KR) .................. 10-2019-0138060

(51) Int. Cl.
| | |
|---|---|
| *H01M 10/42* | (2006.01) |
| *B60L 58/22* | (2019.01) |
| *H04W 84/20* | (2009.01) |
| *G06N 3/08* | (2006.01) |
| *H01M 10/48* | (2006.01) |

(52) U.S. Cl.
CPC .......... *H01M 10/425* (2013.01); *B60L 58/22* (2019.02); *G06N 3/08* (2013.01); *H01M 10/482* (2013.01); *H04W 84/20* (2013.01); *H01M 2010/4271* (2013.01); *H01M 2010/4278* (2013.01)

(58) Field of Classification Search
CPC ........ B60L 2260/32; B60L 3/12; B60L 58/10; B60L 58/16; B60L 58/21; B60L 58/22; G06N 3/04; G06N 3/08; H01M 10/425; H01M 10/44; H01M 10/482; H01M 2010/4271; H01M 2010/4278; H01M 2220/30; H04W 84/20; Y02E 60/10; Y02T 10/70; Y02T 90/16
See application file for complete search history.

(56) References Cited

U.S. PATENT DOCUMENTS

| | | | | |
|---|---|---|---|---|
| 2009/0027009 | A1* | 1/2009 | Sivertsen | H02J 7/0022 320/134 |
| 2019/0237816 | A1* | 8/2019 | Kim | H02J 7/00032 |
| 2019/0356025 | A1* | 11/2019 | Sung | H02J 7/0019 |

FOREIGN PATENT DOCUMENTS

WO    WO-2019066214 A1 *  4/2019  ............ B60L 58/22

* cited by examiner

*Primary Examiner* — Victoria H Lynch
(74) *Attorney, Agent, or Firm* — KED & Associates, LLP

(57) ABSTRACT

A battery system may include: a master battery processor configured to transmit monitoring commands; and slave battery processors configured to be coupled to batteries, and to transmit battery information of the batteries coupled thereto, to the master battery processor in response to the monitoring commands. The master battery processor determines operation modes of the slave battery processors on the basis of the battery information transmitted from the slave battery processors, and the slave battery processors communicate with the master battery processor at different communication participation rates according to the determined operation modes.

20 Claims, 11 Drawing Sheets

WIRELESS BATTERY SYSTEM, METHOD OF OPERATING WIRELESS BATTERY SYSTEM, AND ROBOT WITH APPLICATION OF WIRELESS BATTERY SYSTEM

CROSS-REFERENCE TO RELATED APPLICATION

This application claims priority under 35 U.S.C. § 119 to Korean Application No. 10-2019-0138060 filed on Oct. 31, 2019, whose entire disclosure is hereby incorporated by reference.

BACKGROUND

1. Field

The present disclosure relates to a wireless battery system, a method of operating a wireless battery system, and a robot to which a wireless battery system is applied.

2. Background

A battery system refers to a system that includes multiple batteries capable of storing power and being discharged. The multiple batteries may be connected to multiple battery management systems (BMSs), respectively. The multiple BMSs may perform communication with each other.

In the meantime, recently, the multiple BMSs have been capable of performing communication with a wireless scheme. According to this wireless scheme, a limit on positions of the multiple batteries (or multiple BMSs) can be reduced. However, when reliability of the wireless communication is low, the battery system may not operate normally.

BRIEF DESCRIPTION OF THE DRAWINGS

The embodiments will be described in detail with reference to the following drawings in which like reference numerals refer to like elements wherein.

DETAILED DESCRIPTION

Figure 1:
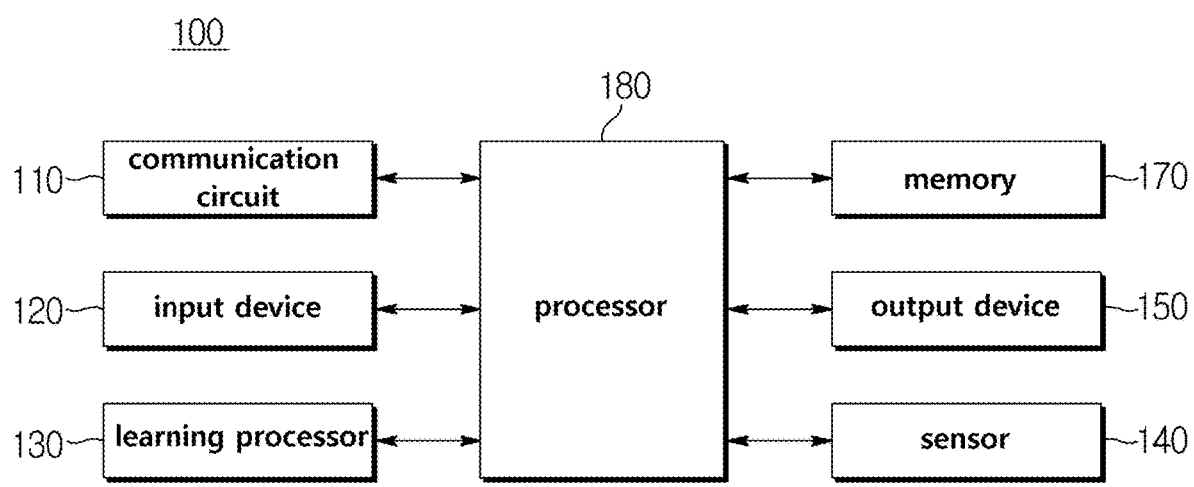
FIG. 1 is a view showing an AI apparatus according to an embodiment of the present disclosure.

Artificial intelligence refers to the field of researching artificial intelligence or the methodology to create the same, and machine learning refers to the field of defining various problems in the field of artificial intelligence and researching the methodology for solving the problems. Machine learning is defined as an algorithm that improves the performance of an operation by performing a consistent experience for the operation.

An artificial neural network (ANN) is a model used in machine learning, configured with artificial neurons (nodes) constituting a network in a synapse coupling, and means a model with problem solving ability. The artificial neural network may be defined by a connection pattern between neurons of other layers, a learning process of updating a model parameter, and an activation function generating an output value.

The artificial neural network may include an input layer, an output layer, and at least one selective hidden layer. Each layer may include at least one neuron, and the artificial neural network may include a synapse that connects neurons. In the artificial neural network, each neuron may output input signals input through a synapse, weights, and a function value of an activation function for a bias.

The model parameter means a parameter determined through learning, and includes a weight of a synapse connection, a bias of a neuron, etc. In addition, a hyper-parameter means a parameter that has to be set before performing learning in a machine learning algorithm, and includes a learning rate, a number of repetition times, a size of a mini-batch, an initialization function, etc.

An objective of performing learning for an artificial neural network is to determine a model parameter that minimizes a loss function. The loss function may be used as an index for determining an optimum model parameter in a learning process of the artificial neural network.

Machine learning may be classified into supervised learning, unsupervised learning, and reinforcement learning according to a learning method. Supervised learning may mean a method of performing learning for an artificial neural network where a label related to learning data is provided, and the label may mean a right answer (or result value) that has to be estimated by the artificial neural network when the learning data is input to the artificial neural network. Unsupervised learning may mean a method of performing learning for an artificial neural network where a label related to learning data is not provided. Reinforcement learning may mean a learning method performing learning so as to select, by an agent defined under a certain environment, an action or an order thereof such that an accumulated reward in each state is maximized.

Machine learning, among artificial neural networks, employed in a deep neural network (DNN) including a plurality of hidden layers, is referred to as deep learning, and the deep learning is a part of the machine learning. Hereinafter, machine learning is used to include deep learning.

A robot may mean a machine capable of automatically carrying out or operating a given operation by its own ability. Particularly, a robot having a function of recognizing an environment, and performing an operation by performing determination by itself may be referred to as an intelligent robot. A robot may be classified into an industrial type, a medical type, a household type, a military type, etc. according to the usage purpose or field.

The robot may be provided with a manipulator including an actuator or a driving device so that the robot may perform various physical operations such as moving a robot joint, and so on. In addition, a movable robot may navigate on the ground or fly in the air by including wheels, brakes and propellers, etc.

Self-driving means the technology of autonomous driving, and a self-driving vehicle means a vehicle that drives without user's manipulations or with the minimum manipulation of the user. For example, self-driving may include the technique of maintaining a driving lane, the technique of automatically adjusting a speed such as adaptive cruise control, the technique of automatically driving along a predetermined route, the technique of automatically setting a route when a destination is set, etc.

Vehicles may include a vehicle with only an internal combustion engine, a hybrid vehicle with an internal combustion engine and an electric motor together, and an electric vehicle with only an electric motor, and may include not only automobiles but also trains and motorcycles.

Herein, a self-driving vehicle may be referred to as a robot with a self-driving function.

Extended reality refers to virtual reality (VR), augmented reality (AR), and mixed reality (MR). The VR technique provides objects and backgrounds of the real world in CG images, the AR technique provides virtual CG images by reflecting the same on real object images, and the MR technique is a computer graphic technique mixing and coupling virtual objects and providing by reflecting the same in the real word.

The MR technique is similar to the AR technique in that real objects and virtual objects are provided together. In the AR technique, virtual objects are used to complement real objects, but in the MR technique, virtual objects and real objects are equivalently used.

The XR technique may be applied by using a head-mount display (HMD), a head-up display (HUD), a mobile phone, a tablet PC, a laptop PC, a desktop PC, a TV, a digital signage, etc., and a device to which the XR technique is applied may be referred to an XR device.

FIG. 1 is a view showing an AI apparatus 100 according to an embodiment of the present disclosure. The AI apparatus 100 may be employed in a fixed or movable type device such as TVs, projectors, mobile phones, smart phones, desktop PCs, laptop PCs, digital broadcasting terminals, PDAs (personal digital assistants), PMPs (portable multimedia player), navigations, tablet PCs, wearable devices, set-top boxes (STB), DMB receiver, radios, washers, refrigerators, digital signages, robots, vehicles, etc.

Referring to FIG. 1, the AI apparatus 100 may include a communication circuit 110, an input device 120, a learning processor 130, a sensor 140, an output device 150, a memory 170, and a processor 180.

The communication circuit 110 may transmit and receive data to/from another AI apparatuses (100a to 100e) or external devices such as an AI server 200 by using wired/wireless communication methods. For example, the communication circuit 110 may transmit and receive sensor information, user input, learning model, control signals, etc. to/from external devices.

Communication methods used by the communication circuit 110 include global system for mobile communication (GSM)), code division multi access (CDMA), long term evolution (LTE), 5G, wireless LAN (WLAN), wireless-fidelity (Wi-Fi), Bluetooth™, radio frequency identification (RFID), infrared data association (IrDA), ZigBee, near field communication (NFC), etc.

The input device 120 may be for obtaining various types of data. The input device 120 may include a camera for an image signal input, a microphone for receiving audio signals, and a user input part for receiving information from the user. Signals obtained from the camera or microphone by using the same as sensors may be referred to as sensing data or sensor information.

The input device 120 may be for obtaining input data used for outputting that is performed by using learning data and a learning model for model learning. The input device 120 may be for obtaining input data that is not processed. Herein, the processor 180 or learning processor 130 may obtain an input feature from input data as preprocessing.

The learning processor 130 may perform learning for a model configured with an artificial neural network by using learning data. Herein, the artificial neural network for which learning is performed may be referred to as a learning model. The learning model may be used for estimating a result value for new input data other than learning data, and the estimated value may be used as a reference for performing a certain operation.

The learning processor 130 may perform AI processing with a learning processor 240 of the AI server 200. The learning processor 130 may be integrated in the AI apparatus 100 or may include a memory employed therein. Alternatively, the learning processor 130 may be employed by using the memory 170, an external memory directly connected to the AI apparatus 100, or a memory maintained in an external device.

The sensor 140 may obtain at least one among internal information of the AI apparatus 100, surrounding environmental information of the AI apparatus 100, and user information by using various sensors.

Herein, the sensor 140 may include a proximity sensor, an ambient light sensor, an acceleration sensor, a magnetic sensor, a gyro sensor, an inertial sensor, an RGB sensor, an IR sensor, a fingerprint recognizing sensor, a ultrasonic sensor, an optical sensor, a microphone, a lidar, a radar, etc.

The output device 150 may generate an output related to visual, auditory, or tactile.

Herein, the output device 150 may include a display for visually outputting information, a speaker for acoustically outputting information, and a haptic actuator for tactually outputting information. For example, the display may output an image or video, the speaker may output a voice or sound, and the haptic actuator may output vibration.

The memory 170 may be for storing data supporting various functions of the AI apparatus 100. For example, in the memory 170, input data obtained through the input device 120, learning data, a learning model, a learning history, etc. may be stored.

The processor 180 may determine at least one executable operation of the AI apparatus 100 which is determined on the basis of information determined or generated by using a data analysis algorithm or machine learning algorithm. In addition, the processor 180 may perform the determined operation by controlling components of the AI apparatus 100.

For the same, the processor 180 may make a request, retrieve, receive, or use data of the learning processor 130 or the memory 170, and control components of the AI apparatus 100 so as to perform the estimated operation of the at least one executable operation, or an operation that is determined to be desirable.

In order to perform the determined operation, the processor 180 may generate, when association with an external device is required, a control signal for controlling the corresponding external device, and transmit the generated control signal to the corresponding external device.

The processor 180 may obtain intention information on the user's input, and determine a user's requirement on the basis of the obtained intention information. The processor 180 may obtain intention information in association with the user's input by using at least one among a STT (speech-to-text) engine converting a voice input into text strings, and a natural language processing (NLP) engine obtaining intention information of natural language.

A part of the at least one among the STT engine and the NLP engine may be configured with an artificial neural network for which learning is performed according to a machine learning algorithm. In addition, for at least one among the STT engine and the NLP engine, learning may be performed by the learning processor 130, learning may be is performed by the learning processor 240 of the AI server 200, or learning may be performed through distribution processing of the above processors.

The processor 180 may collect record information including operation content of the AI apparatus 100 and user's feedback in association with the operation, etc. so as to store in the memory 170 or learning processor 130, or transmit the information to the external device such as an AI server 200, etc. The collected record information may be used when updating a learning model.

The processor 180 may control a part of components of the AI apparatus 100 so as to execute application programs stored in the memory 170. Further, the processor 180 may operate components of the AI apparatus 100 by combining at least two thereof so as to execute the application programs.

Figure 2:
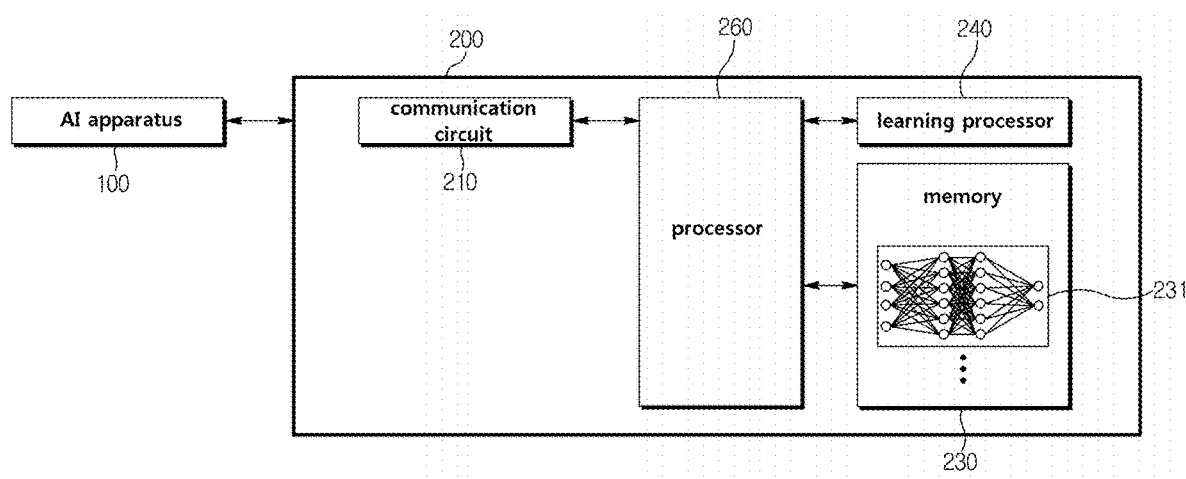
FIG. 2 is a view showing an AI server according to an embodiment of the present disclosure.

FIG. 2 is a view showing an AI server 200 according to an embodiment of the present disclosure. Referring to FIG. 2, the AI server 200 may mean a device performing learning for an artificial neural network by using a machine learning algorithm, or a device using the artificial neural network for which learning is performed. The AI server 200 may perform distributed processing by being configured with a plurality of servers, or may be defined as a 5G network. The AI server 200 may perform at least a part of AI processing by being included as a partial component of the AI apparatus 100.

The AI server 200 may perform at least a part of AI processing by being included as a partial component of the AI apparatus 100. The communication circuit 210 may transmit and receive data to/from the external devices such as AI apparatus 100, etc. The memory 230 may be for storing a model (or artificial neural network, 231) for which learning is ongoing or performed by the learning processor 240.

The learning processor 240 may perform learning for an artificial neural network 231 by using learning data. A learning model may be used by being integrated in the AI server 200 of the artificial neural network, or by being integrated in the external device such as an AI apparatus 100, etc. The learning model may be employed in hardware, software, or combination thereof. When a part or the entire of the learning model is employed in software, at least one instruction constituting the learning model may be stored in the memory 230.

The processor 260 may estimate a result value for new input data by using the learning model, and generate a response or control command on the basis of the estimated result value.

Figure 3:
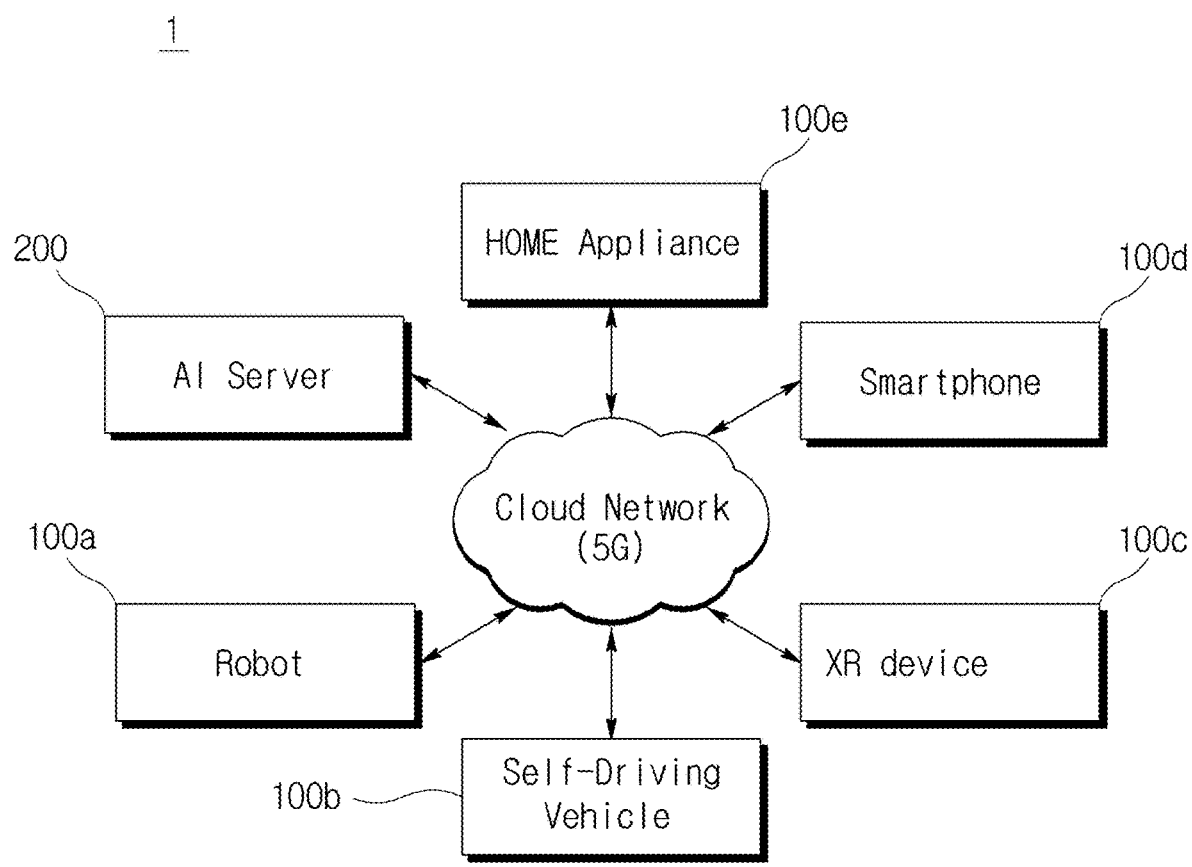
FIG. 3 is a view showing an AI system according to an embodiment of the present disclosure.

FIG. 3 is a view showing an AI system 1 according to an embodiment of the present disclosure. The AI system 1 is connected to at least one cloud network 10 among the AI server 200, a robot 100a, self-driving vehicle 100b, an XR device 100c, a smart phone 100d, and a home appliance 100e. The robot 100a, the self-driving vehicle 100b, the XR device 100c, the smart phone 100d or the home appliance 100e to which the AI technique is applied may be referred to as the AI apparatus (100a to 100e).

The cloud network 10 may mean a network constituting a part of cloud computing infrastructure or a network present in the cloud computing infrastructure. The cloud network 10 may be configured by using a 3G network, a 4G or LTE network, a 5G network, etc.

In other words, each device (100a to 100e, 200) constituting the AI system 1 may be connected with each other through the cloud network 10. Particularly, each device (100a to 100e, 200) may perform communication with each other through a base station, and also may perform direct communication without using the base station.

The AI server 200 may include a server performing AI processing, and a server performing calculation for big data. The AI server 200 may be connected to at least one of AI apparatus constituting an AI system 1 configured with the robot 100a, the self-driving vehicle 100b, the XR device 100c, the smart phone 100d, and the home appliance 100e through the cloud network 10, and the AI server 200 may support a part of the AI processing of the connected AI apparatuses (100a to 100e).

The AI server 200 may perform learning on an artificial neural network according to a machine learning algorithm in place of the AI apparatus (100a to 100e), may directly store a learning model, or transmit the learning model to the AI apparatus (100a to 100e).

The AI server 200 may receive input data from the AI apparatus (100a to 100e), estimate a result value for the received input data by using a learning model, and generate a response or control command on the basis of the estimated result value so as to transmit the same to the AI apparatus (100a to 100e).

Alternatively, the AI apparatus (100a to 100e) may estimate a result value for the received input data by directly using a learning model, and generate a response or control command on the basis of the estimated result value.

Hereinafter, various examples of the AI apparatus (100a to 100e) to which the above described technique is applied will be described. The AI apparatus (100a to 100e) shown in FIG. 3 may be referred to a detailed example of the AI apparatus 100 shown in FIG. 1.

The robot 100a may be employed in a guide robot, a transport robot, a cleaning robot, a wearable robot, an entertainment robot, a pet robot, an unmanned flying robot, etc. by applying the AI technique thereto.

The robot 100a may include a robot control module for controlling operations, and the robot control module may mean a software module or a chip where the same is employed therein.

The robot 100a may obtain state information of the robot 100a, detect (recognize) a surrounding environment or objects, generate map data, determine a moving path or driving plan, determine a response in association with a user interaction, or determine operations by using sensor information that is obtained through various types of sensors.

Herein, in order to determine a moving path or driving plan, the robot 100a may use sensor information obtained by using at least one sensor of a lidar, a radar, and a camera.

The robot 100a may perform the above operations by using a learning model configured with at least one artificial neural network. For example, the robot 100a may recognize a surrounding environment and objects by using a learning model, and determine operations by using the recognized surrounding environment information or object information. Herein, the learning model may be obtained by directly performing learning by the robot 100a, or by performing learning by the external device such as an AI server 200, etc.

The robot 100a may generate a result by directly using the learning model so as to perform operations. However, the robot 100a may transmit the sensor information to the external device such as an AI server 200, and receive a result generated according thereto so as to perform operations.

The robot 100a may determine a moving path and a driving plan by using at least one among map data, object information detected from the sensor information, and object information obtained from the external device, and drive according to the determined moving path and the driving plan by controlling a driving part.

Map data may include object identification information on various objects arranged in a space where the robot 100a moves. For example, the map data may include object identification information on fixed objects such as walls, doors, etc., and movable objects such as flowerpots, tables, etc. In addition, the object identification information may include a name, a type, a distance, a position, etc.

In addition, the robot 100a may perform operations or drive by controlling the driving part on the basis of the user's control/interaction. Herein, the robot 100a may obtain intention information on interaction according to a user's behavior or voice input, and determine a response on the basis of the obtained intention information so as to perform operations.

The self-driving vehicle 100b may be employed as a movable robot, a vehicle, an unmanned flying robot, etc. by applying the AI technique thereto. The self-driving vehicle 100b may include a self-driving control module controlling a self-driving function, and the self-driving control module may mean a software module or a chip where the same is employed in hardware. The self-driving control module may be included in the self-driving vehicle 100b as a component thereof, but may be connected to the self-driving vehicle 100b by being configured in separate hardware.

The self-driving vehicle 100b may obtain state information of the self-driving vehicle 100b, detect (recognize) a surrounding environment and objects, generate map data, determine a moving path and a driving plan, or determine operations by using sensor information obtained through various types of sensors.

In order to determine a moving path or driving plan, the self-driving vehicle 100b, similar to the robot 100a, may use sensor information obtained by using at least one sensor of a lidar, a radar, and a camera.

Particularly, the self-driving vehicle 100b may recognize an environment and objects for areas that are hidden from view or over a certain distance by receiving sensor information from external devices, or by receiving information directly recognized from the external devices.

The self-driving vehicle 100b may perform the above operations by using a learning model configured with at least one artificial neural network. For example, the self-driving vehicle 100b may recognize a surrounding environment and objects by using a learning model, and determine a driving path by using the recognized surrounding environment information or object information. Herein, the learning model may be obtained by directly performing learning by the self-driving vehicle 100b, or by performing learning by the external device such as an AI server 200, etc.

The self-driving vehicle 100b may generate a result by directly using the learning model so as to perform operations. However, the self-driving vehicle 100b may transmit the sensor information to the external device such as an AI server 200, and receive a result generated according thereto so as to perform operations.

The self-driving vehicle 100b may determine a moving path and a driving plan by using at least one among map data, object information detected from the sensor information, and object information obtained from the external device, and drive according to the determined moving path and the driving plan by controlling a driving part.

Map data may include object identification information on various objects (for example, roads) arranged in a space where the self-driving vehicle 100b drives. For example, the map data may include object identification information on fixed objects such as street lamps, rocks, buildings, etc. and movable objects such as vehicles, pedestrians, etc. In addition, the object identification information may include a name, a type, a distance, a position, etc.

In addition, the self-driving vehicle 100b may perform operations or drive by controlling the driving part on the basis of the user's control/interaction. The self-driving vehicle 100b may obtain intention information on interaction according to a user's behavior or voice input, and determine a response on the basis of the obtained intention information so as to perform operations.

The XR device 100c may be employed by using a HMD, a HUD provided in a vehicle, a TV, a mobile phone, a smart phone, a PC, a wearable device, a home appliance, a digital signage, a vehicle, or a fixed type robot or movable type robot.

The XR device 100c analyze 3D point cloud data or image data which is obtained through various sensors or external devices, generate position data and feature data on 3D points, and obtain information on a surrounding space and real objects and output XR objects to be rendered. For example, the XR device 100c may output XR objects including additional information on the recognized objects by reflecting the same in the corresponding recognized objects.

The XR device 100c may perform the above operations by using a learning model configured with at least one artificial neural network. For example, the XR device 100c may recognize real objects from 3D point cloud data or image data by using a learning model, and provide information in association with the recognized real objects. Herein, the learning model may be obtained by directly performing learning by the XR device 100c, or by performing learning by the external device such as an AI server 200, etc.

Herein, the XR device 100c may generate a result by directly using the learning model so as to perform operations. However, the XR device 100c may transmit the sensor information to the external device such as an AI server 200, and receive a result generated according thereto so as to perform operations.

The robot 100a may be employed in a guide robot, a transport robot, a cleaning robot, a wearable robot, an entertainment robot, a pet robot, an unmanned flying robot, etc. by applying the AI technique and the self-driving technique thereto.

The robot 100a to which the AI technique and the self-driving technique are applied may mean a robot itself with a self-driving function, or the robot 100a operating in conjunction with the self-driving vehicle 100b.

The robot 100a with the self-driving function may refer to all devices moving by itself according to a given movement, or by determining a moving path by itself without a user control.

The robot 100a and the self-driving vehicle 100b which respectively have self-driving functions may use a common sensing method for determining at least one among a moving path and a driving plan. For example, the robot 100a and the self-driving vehicle 100b which respectively have self-driving functions may determine a moving path or driving plan by using information sensed through a lidar, a radar, a camera, etc.

The robot 100a operating in conjunction with the self-driving vehicle 100b may be present separate from the self-driving vehicle 100b, while the robot 100a is internally or externally connected to the self-driving function of the self-driving vehicle 100b, or may perform operations in association with the driver of the self-driving vehicle 100b.

Herein, the robot 100a operating in conjunction with the self-driving vehicle 100b may obtain sensor information in place of the self-driving vehicle 100b so as to provide the information to the self-driving vehicle 100b, or obtain sensor information and generate surrounding environment information or object information so as to provide the information to the self-driving vehicle 100b, and thus control or supplement the self-driving function of the self-driving vehicle 100b.

Alternatively, the robot 100a operating in conjunction with the self-driving vehicle 100b may monitor a driver of the self-driving vehicle 100b, or control functions of the self-driving vehicle 100b by operating in conjunction with the driver. For example, when it is determined that the driver is drowsy, the robot 100a may activate the self-driving function of the self-driving vehicle 100b or control the driving part of the self-driving vehicle 100b. Herein, functions of the self-driving vehicle 100b which are controlled by the robot 100a include, in addition to the self-driving function, functions provided from a navigation system or audio system provided in the self-driving vehicle 100b.

Alternatively, the robot 100a operating in conjunction with the self-driving vehicle 100b may provide information or supplement functions of the self-driving vehicle 100b from the outside of the self-driving vehicle 100b. For example, the robot 100a may provide traffic information including signal information such as smart signals to the self-driving vehicle 100b, or may automatically connect to an electrical charging device such as an automatic electric charger of an electric vehicle by operating in conjunction with the self-driving vehicle 100b.

The robot 100a may be employed in a guide robot, a transport robot, a cleaning robot, a wearable robot, an entertainment robot, a pet robot, an unmanned flying robot, a drone, etc. by applying the AI technique and the XR technique thereto.

The robot 100a to which the XR technique is applied may mean a robot that becomes a target controlled/operated within an XR image. Herein, the robot 100a may be distinguished from the XR device 100c and operate in conjunction with the same.

For the robot 100a that becomes a target controlled/operated within an XR image, when sensor information is obtained from sensors including a camera, the robot 100a or the XR device 100c may generate an XR image on the basis of the sensor information, and the XR device 100c may output the generated XR image. In addition, the above robot 100a may operate on the basis of a control signal input through the XR device 100c, or in conjunction with the user.

For example, the user may check an XR image in association with a view of the robot 100a that is in conjunction with the external device such as XR device 100c in a remote manner, adjust a self-driving path of the robot 100a through in conjunction with the robot 100a, control operations or driving, or check information on surrounding objects.

The self-driving vehicle 100b may be employed in a movable robot, a vehicle, an unmanned flying robot, etc. by applying the AI technique and the XR technique thereto.

The self-driving vehicle 100b to which the XR technique is applied may mean self-driving vehicle provided with a device providing an XR image, and self-driving vehicle that becomes a target controlled/operated within an XR image, etc. Particularly, the self-driving vehicle 100b that becomes a target controlled/operated within an XR image may be distinguished from the XR device 100c, and operate in conjunction with the same.

The self-driving vehicle 100b provided with a device providing an XR image may obtain sensor information from sensors including a camera, and output an XR image generated on the basis of the obtained sensor information. For example, the self-driving vehicle 100b outputs an XR image by using a HUD, and thus provides to a passenger a real object or XR object in association with objects within a screen.

Herein, when the XR object is displayed on the HUD, at least a part of the XR object may be displayed to overlap the real object to which the passenger's eyes are directed. On the other hand, when the XR object displayed on a display included in the self-driving vehicle 100b, at least a part of the XR object may be displayed to overlap an object within the screen. For example, the self-driving vehicle 100b may output XR objects in association with carriageways, other vehicles, signals, traffic signs, motorcycles, pedestrians, buildings, etc.

For the self-driving vehicle 100b that becomes a target controlled/operated within an XR image, when sensor information is obtained from sensors including a camera, the self-driving vehicle 100b or XR device 100c may generate an XR image on the basis of the sensor information, and the XR device 100c may output the generated XR image. In addition, the above self-driving vehicle 100b may operate on the basis of a control signal input through the external device such as XR device 100c, etc. or in conjunction with the user.

Figure 4:
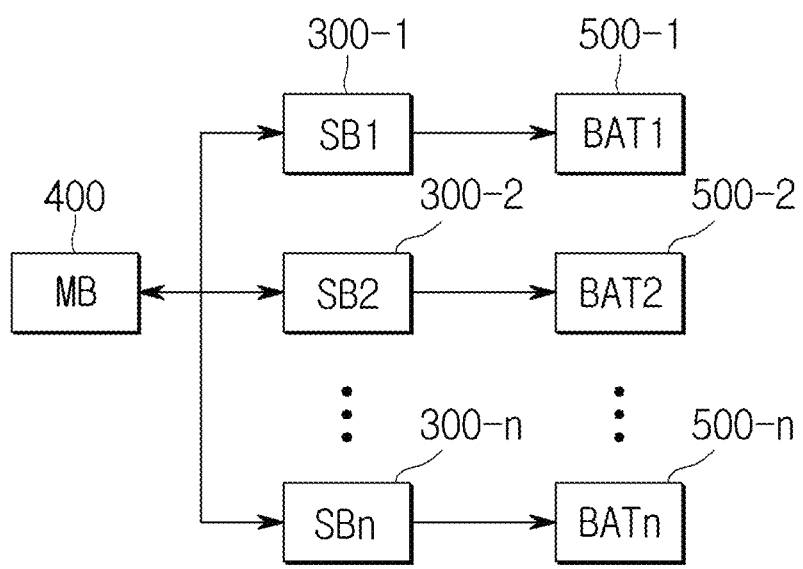
FIG. 4 is a view showing a battery system according to embodiments of the present disclosure.

FIG. 4 is a view showing a battery system according to embodiments of the present disclosure. Referring to FIGS. 1 to 4, a battery system 20 may include slave battery processors 300-1 to 300-n (herein, n is a natural number of 2 or more), a master battery processor 400, and batteries 500-1 to 500-n. Although only one master battery processor 400 is shown in FIG. 4, the battery system 20 according to embodiments may include two or more master battery processors.

The master battery processor 400 and the slave battery processors 300-1 to 300-n may be hardware having calculation processing capabilities. According to embodiments, the master battery processor 400 and the slave battery processors 300-1 to 300-n may be integrated circuits, central processing units (CPUs), micro processing units (MCUs), graphic processing units (GPUs), or application specific integrated circuits (ASICs), but are not limited thereto.

The battery system 20 may perform charging with power or discharging. According to embodiments, the battery system 20 may be included in the AI apparatus 100 or the AI server 200 described with reference to FIGS. 1 to 3, and may supply power required for the AI apparatus 100 or the AI server 200. For example, the battery system 20 may supply the stored power that is the power required for the AI apparatus 100 or the AI server 200, and may also store power supplied from a power source (for example, a grid).

The battery system 20 may be a wireless battery system. According to embodiments, the master battery processor

400 and the slave battery processors 300-1 to 300-*n* may transmit and receive data from each other by using a wireless communication protocol.

The slave battery processors 300-1 to 300-*n* may be coupled to the batteries 500-1 to 500-*n* in a one-to-one manner. According to embodiments, the slave battery processors 300-1 to 300-*n* may be electrically connected to the batteries 500-1 to 500-*n*, respectively. For example, a first slave battery processor 300-1 may be electrically connected to a first battery 500-1.

The slave battery processors 300-1 to 300-*n* may receive, from the batteries 500-1 to 500-*n* respectively coupled thereto, battery information indicating states of the batteries 500-1 to 500-*n*, respectively. According to embodiments, the slave battery processors 300-1 to 300-*n* may monitor the states of the batteries 500-1 to 500-*n* respectively coupled thereto, and may acquire the battery information indicating the states of the batteries 500-1 to 500-*n* respectively coupled thereto, according to a result of the monitoring.

The battery information may refer to information indicating the overall states of the batteries 500-1 to 500-*n*. According to embodiments, the battery information may include at least one among capacities of the batteries 500-1 to 500-*n*, state of charge (SOC) or depth of discharge of the batteries 500-1 to 500-*n*, a remaining lifespan (state of health (SOH)) of the batteries 500-1 to 500-*n*, temperatures of the batteries 500-1 to 500-*n*, voltages of the batteries 500-1 to 500-*n*, currents of the batteries 500-1 to 500-*n*, and positions of the batteries 500-1 to 500-*n*, but it is not limited thereto.

The capacity of the battery may refer to the amount of power that a completely discharged battery may store or the amount of power that a completely charged battery may supply. In general, the capacity of the battery may be determined at the time of manufacture. However, as will be described later, as the battery is used, the amount of power that the battery may actually store or supply is decreased. Therefore, the capacity of the battery described in this specification may refer to the capacity of the battery of which the remaining lifespan is 100%.

The state of charge (SOC) of the battery indicates the amount of power that the battery currently stores. That is, the case where the state of charge (SOC) of the battery is 100% (in other words, the depth of discharge is 0%) refers to the fact that the battery is completely charged.

The remaining lifespan (or state of health (SOH)) of the battery indicates the available capacity compared to the (initial) capacity of the battery. That is, in the case where the remaining lifespan is reduced as the battery is used, the amount of power in which the battery is actually capable of being charged (or discharged) is lower than the amount of power in which the initial battery is capable of being charged. For example, the available capacity of the battery of which the remaining lifespan is 100% may be the same as the (initial) capacity of the battery, but the available capacity of the battery of which the remaining lifespan is 50% may be half of the (initial) capacity of the battery.

The slave battery processors 300-1 to 300-*n* may transmit data to the master battery processor 400. The data may include the battery information. According to embodiments, the slave battery processors 300-1 to 300-*n* may transmit respective IDs and data of the slave battery processors 300-1 to 300-*n* to the master battery processor 400. For example, the first slave battery processor 300-1 may transmit first battery information and a first ID for identifying the first slave battery processor 300-1, to the master battery processor 400. A second slave battery processor 300-2 may transmit second battery information and a second ID for identifying the second slave battery processor 300-2, to the master battery processor 400.

The slave battery processors 300-1 to 300-*n* may receive data transmitted from nearby devices, and may store the received data. According to embodiments, the slave battery processors 300-1 to 300-*n* may receive data transmitted from another slave battery processors or the master battery processor 400, and may store the received data.

The slave battery processors 300-1 to 300-*n* may control the batteries 500-1 to 500-*n* respectively coupled thereto. According to embodiments, the slave battery processors 300-1 to 300-*n* may control at least one among charging and discharging of the batteries 500-1 to 500-*n* respectively coupled thereto. That is, in this specification, controlling, by the slave battery processors 300-1 to 300-*n*, the batteries 500-1 to 500-*n* coupled thereto may refer to controlling at least one among charging and discharging of the batteries 500-1 to 500-*n* coupled thereto.

According to embodiments, the slave battery processors 300-1 to 300-*n* may operate using electric energy (or power) with which the batteries 500-1 to 500-*n* coupled thereto is charged. For example, the slave battery processors 300-1 to 300-*n* may perform, by using energy stored in the batteries 500-1 to 500-*n* respectively coupled thereto, communication with the master battery processor 400, or may supply energy stored in the batteries 500-1 to 500-*n* coupled thereto, to nearby devices.

The master battery processor 400 and the slave battery processors 300-1 to 300-*n* may transmit and receive data from with other. According to embodiments, the master battery processor 400 may receive, from the slave battery processors 300-1 to 300-*n*, battery information of the batteries 500-1 to 500-*n* respectively coupled thereto. For example, the master battery processor 400 may receive, from the slave battery processors 300-1 to 300-*n*, the IDs of the slave battery processors 300-1 to 300-*n* and the battery information.

The master battery processor 400 may control the slave battery processors 300-1 to 300-*n*. According to embodiments, the master battery processor 400 may transmit an operation command for operating the slave battery processors 300-1 to 300-*n*, to the slave battery processors 300-1 to 300-*n*. The slave battery processors 300-1 to 300-*n* may control the batteries 500-1 to 500-*n* coupled thereto, in response to the operation command.

The master battery processor 400 may receive the battery information transmitted from the slave battery processors 300-1 to 300-*n*, and may control operation of the slave battery processors 300-1 to 300-*n*, on the basis of the received battery information. According to embodiments, the master battery processor 400 may determine, on the basis of the received battery information, operation modes of the respective slave battery processors 300-1 to 300-*n*.

The operation modes of the slave battery processors 300-1 to 300-*n* are related to power consumption (or electric energy consumption) of the slave battery processors 300-1 to 300-*n*, and electric energy consumed by the slave battery processors 300-1 to 300-*n* may vary according to operation mode. That is, the slave battery processors 300-1 to 300-*n* may consume electric energy of the batteries 500-1 to 500-*n* coupled thereto, according to the operation modes.

The master battery processor 400 may transmit operation commands including the determined operation modes to the slave battery processors 300-1 to 300-*n*.

According to embodiments, the master battery processor 400 may transmit operation commands including the IDs and the operation modes of the slave battery processors 300-1 to **300-*n*, to the slave battery processors 300-1 to 300-*n*. The slave battery processors 300-1 to 300-*n*** may recognize the operation modes corresponding to the IDs and may operate according to the operation modes.

In addition, according to embodiments, the master battery processor 400 may transmit operation commands including the operation modes corresponding to the respective slave battery processors 300-1 to **300-*n*, to the slave battery processors 300-1 to 300-*n*, individually. The slave battery processors 300-1 to 300-*n*** may operate according to the operation modes included in the received operation commands.

The batteries 500-1 to **500-*n* may be electrically coupled to the slave battery processors 300-1 to 300-*n*, and may be subjected to at least one among charging and discharging, according to control by the slave battery processors 300-1 to 300-*n***.

Each of the batteries 500-1 to **500-*n*** may include multiple battery cells. The multiple batteries may be connected in series, parallel, or a combination of series and parallel connections.

The batteries 500-1 to **500-*n* may be secondary batteries, but are not limited thereto. The batteries 500-1 to 500-*n*** may be any batteries capable of being charged with power or discharged.

Figure 5:
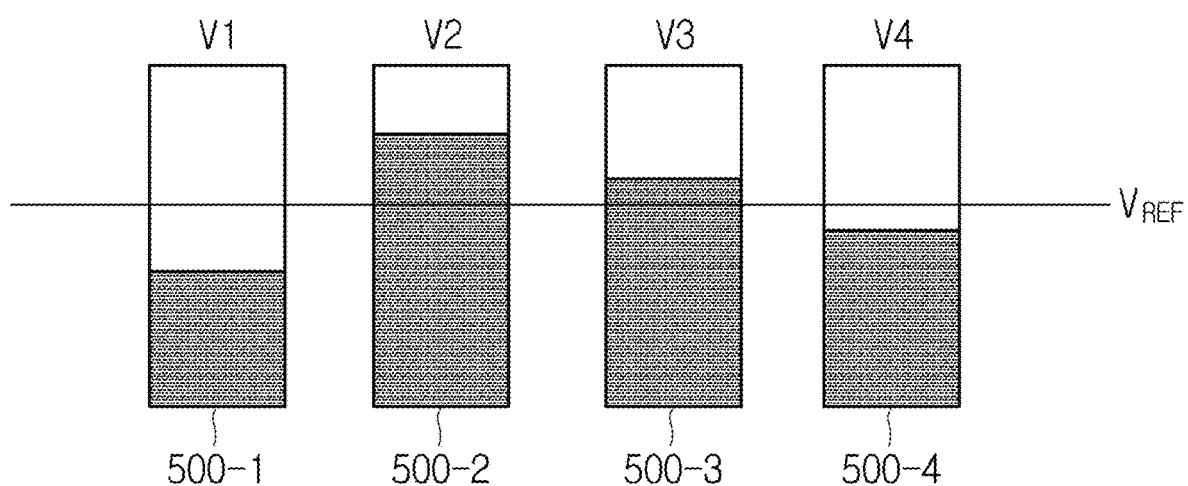
FIG. 5 is a view showing battery balancing according to embodiments of the present disclosure.

FIG. 5 is a view showing battery balancing according to embodiments of the present disclosure. FIG. 5 shows four batteries 500-1 to 500-4 with the respective voltages V1 to V4.

As the batteries 500-1 to 500-4 is used, battery states (for example, voltages V1 to V4) of the respective batteries 500-1 to 500-4 may differ. When the states of the respective batteries 500-1 to 500-4 differ, imbalance between the batteries 500-1 to 500-4 occurs, and a particular battery among the batteries 500-1 to 500-4 is charged first or is discharged first. Thus, efficiency of the batteries 500-1 to 500-4 may be reduced, and this inequality may be exacerbated.

When the imbalance between the batteries 500-1 to 500-4 occurs, the battery system 20 performs balancing to solve the imbalance between the batteries 500-1 to 500-4. According to embodiments, the master battery processor 400 may transmit balancing commands to the slave battery processors 300-1 to 300-4 coupled to the batteries requiring balancing. The slave battery processors may perform balancing in response to the balancing commands. For example, the slave battery processor may further increase power usage of the battery coupled thereto, in response to the balancing command. For example, the slave battery processor may include resistors for balancing, and may further discharge the battery storing power, by using the resistors for balancing, in response to the balancing command.

The master battery processor 400 may determine, on the basis of the battery information, the battery requiring balancing among the batteries 500-1 to 500-4. According to a result of the determination, the master battery processor 400 may transmit the balancing command for performing balancing on the battery requiring balancing, to the corresponding slave battery processors 300-1 to 300-4. For example, in the case where the master battery processor 400 determines that the first battery 500-1 requires balancing, the master battery processor 400 may transmit the balancing command to the first slave battery processor 300-1.

According to embodiments, the master battery processor 400 may determine that the battery among the batteries 500-1 to 500-4 which has a voltage equal to or higher than a reference voltage $V_{REF}$ requires balancing. For example, in the case of FIG. 5, a second voltage V2 of a second battery 500-2 and a third voltage V3 of a third battery 500-3 exceed the reference voltage $V_{REF}$, and thus the master battery processor 400 may determine that the second battery 500-2 and the third battery 500-3 require balancing. Further, the master battery processor 400 may transmit the balancing commands to the second slave battery processor 300-2 and a third slave battery processor 300-3. The second slave battery processor 300-2 and the third slave battery processor 300-3 may increase usage of the second battery 500-2 and the third battery 500-3 in response to the balancing commands. Accordingly, the voltage V2 of the second battery 500-2 and the voltage V3 of the third battery 500-3 reduce quicker than the voltages of the remaining batteries, and thus the imbalance between the batteries 500-1 to 500-4 may be gradually solved.

According to embodiments, the master battery processor 400 may determine that the battery among the batteries 500-1 to 500-4 which has the highest voltage requires balancing. For example, in the case of FIG. 5, the second voltage V2 of the second battery 500-2 is higher than the voltages of the remaining batteries. Therefore, the master battery processor 400 may determine that the second battery 500-2 requires balancing. Further, the master battery processor 400 may transmit the balancing command to the second slave battery processor 300-2. The second slave battery processor 300-2 may increase usage of the second battery 500-2 in response to the balancing command. Accordingly, the voltage V2 of the second battery 500-2 reduces quicker than the voltages of the remaining batteries, and thus the imbalance between the batteries 500-1 to 500-4 may be gradually solved.

As will be described later, according to the battery system 20 according to embodiments of the present disclosure, a communication participation rate for the slave battery processor coupled to the battery requiring balancing may be increased, and reliability of communication of the battery system 20 may be enhanced.

In this specification, the communication participation rate refers to the degree (or relative importance) at which each of the slave battery processors accounts for, in communication with the master battery processor. According to embodiments, the communication participation rate may indicate the electric energy that each of the slave battery processors uses in communication with the master battery processor. For example, the case where the communication participation rate for the first slave battery processor is higher than the communication participation rate for the second slave battery processor may refer to the fact that the first slave battery processor transmits more signals than the second slave battery processor, the fact that the first slave battery processor transmits a stronger signal than the second slave battery processor, the fact that the first slave battery processor transmits signals with greater frequency (in other words, more often) than the second slave battery processor, or the fact that the first slave battery processor uses more electric energy (or power) for communication than the second slave battery processor, but it is not limited thereto.

Figure 6:
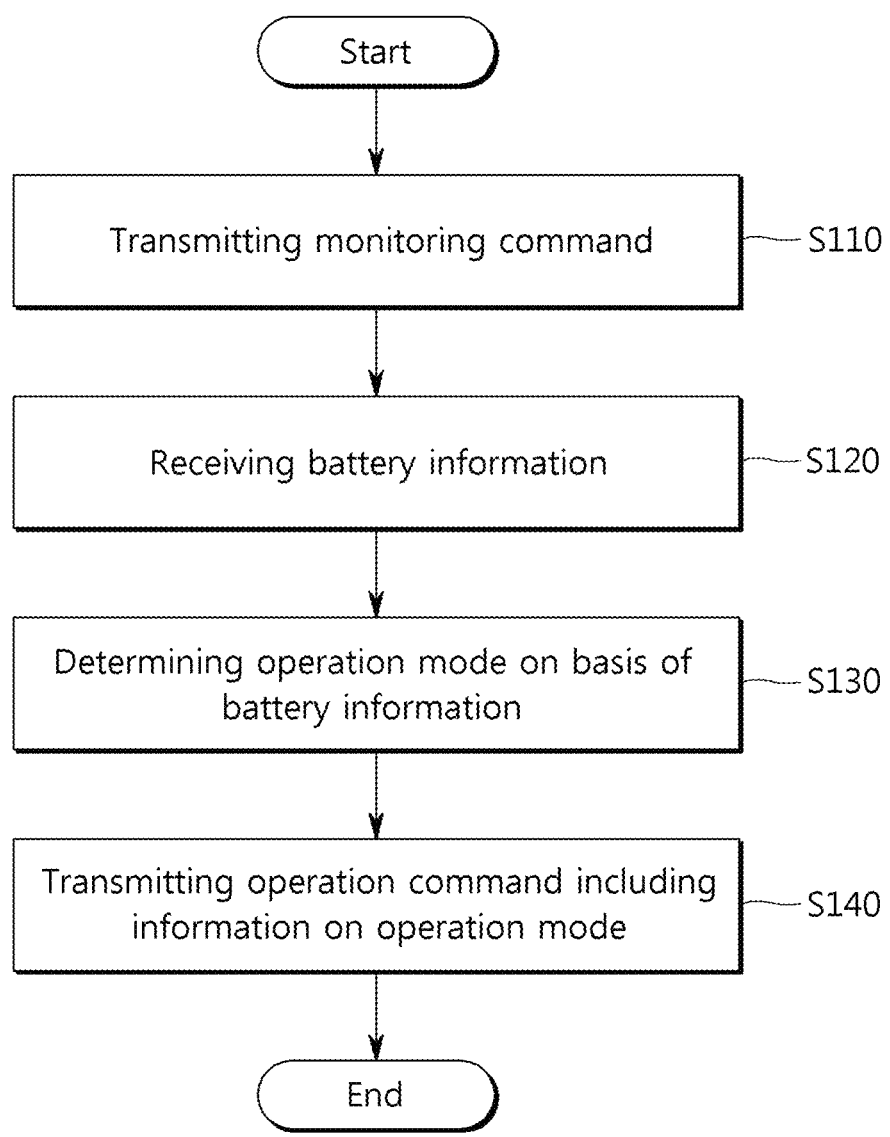
FIG. 6 is a flowchart showing a method of operating a master battery processor according to embodiments of the present disclosure.

FIG. 6 is a flowchart showing a method of operating a master battery processor according to embodiments of the present disclosure. The method shown in FIG. 6 may be performed by the master battery processor 400. In addition, the method may be implemented by instructions executable by the master battery processor 400. The instructions may be stored in a computer readable storage medium.

Referring to FIGS. 1 to 6, the master battery processor 400 may transmit monitoring commands at step S110. According to embodiments, the master battery processor 400 may transmit monitoring commands to the slave battery processors 300-1 to 300-*n*. For example, the master battery processor 400 may transmit the monitoring commands to the slave battery processors 300-1 to 300-*n* at set intervals.

The master battery processor 400 may receive the battery information from the slave battery processors 300-1 to 300-*n* at step S120. According to embodiments, the master battery processor 400 may receive the battery information and the ID of the corresponding slave battery processor, and may match the received ID and the received battery information for storage. For example, the first slave battery processor 300-1 may transmit the first battery information of the first battery 500-1 and the first ID of the first slave battery processor 300-1 to the master battery processor 400, and the master battery processor 400 may receive the first battery information and the first ID.

The master battery processor 400 may periodically transmit the monitoring commands. Each time a period ends, the master battery processor 400 may transmit, to the slave battery processors 300-1 to 300-*n*, acknowledgements including the IDs of the slave battery processors (specifically, the slave battery processors transmitting the battery information that the master battery processor 400 receives) corresponding to the received battery information among slave battery processors 300-1 to 300-*n*.

The master battery processor 400 may determine, on the basis of the battery information, the operation modes of the slave battery processors 300-1 to 300-*n* at step S130. According to embodiments, the master battery processor 400 may determine each of the operation modes of the slave battery processors 300-1 to 300-*n* to be any one among an active mode, a normal mode, and a passive mode. In this specification, the active mode may be referred to as a first mode, and the normal mode and the passive mode may be referred to as a second mode. That is, the master battery processor 400 may determine each of the operation modes of the slave battery processors 300-1 to 300-*n* to be any one among the first mode and the second mode. The master battery processor 400 may transmit the operation commands including the determined operation modes, to the slave battery processors 300-1 to 300-*n* at step S140.

The master battery processor 400 may determine, on the basis of the battery information, the battery among the batteries 500-1 to 500-*n* which requires balancing. In addition, the master battery processor 400 may determine the operation mode of the slave battery processor coupled to the battery requiring balancing among the slave battery processors 300-1 to 300-*n*, to be the active mode (for example, the first mode).

According to embodiments, the master battery processor 400 may determine, on the basis of the battery information, the operation mode of the slave battery processor coupled to the battery among the batteries 500-1 to 500-*n* which has a relatively high voltage, to be the active mode (for example, the first mode). For example, the master battery processor 400 may determine the operation mode of the slave battery processor coupled to the battery among the batteries 500-1 to 500-*n* which has the highest voltage, to be the active mode (for example, the first mode). Further, the master battery processor 400 may determine the operation mode of the slave battery processor coupled to the battery among the batteries 500-1 to 500-*n* which has a voltage exceeding the reference voltage, to be the active mode (for example, the first mode).

The master battery processor 400 may determine, on the basis of the battery information, the battery among the batteries 500-1 to 500-*n* which does not require balancing. In addition, the master battery processor 400 may determine the operation mode of the slave battery processor coupled to the battery among the slave battery processors 300-1 to 300-*n* which does not require balancing, to be the passive mode or the normal mode (for example, the second mode).

According to embodiments, the master battery processor 400 may determine, on the basis of the battery information, the operation mode of the slave battery processor coupled to the battery among the batteries 500-1 to 500-*n* which has a relatively low voltage, to be the passive mode (for example, the second mode). For example, the master battery processor 400 may determine the operation mode of the slave battery processor coupled to the battery among the batteries 500-1 to 500-*n* which has the lowest voltage, to be the passive mode (for example, the second mode). Further, the master battery processor 400 may determine the operation mode of the slave battery processor coupled to the battery among the batteries 500-1 to 500-*n* which has a voltage equal to or lower than the reference voltage, to be the passive mode (for example, the second mode).

The master battery processor 400 may determine the operation mode of the slave battery processor among the slave battery processors 300-1 to 300-*n* which is in a good communication state with the master battery processor 400, to be the active mode (for example, the first mode). For example, the master battery processor 400 may determine the operation mode of the slave battery processor among the slave battery processors 300-1 to 300-*n*, to be the active mode (for example, the first mode), wherein the slave battery processor transmits data with a transmission signal strength equal to or greater than a reference strength, transmits with a transmission period shorter than a reference period, transmits with frequency of transmissions greater than reference frequency, or transmits the battery information to the master battery processor 400 normally.

The master battery processor 400 may determine the operation mode of the slave battery processor among the slave battery processors 300-1 to 300-*n* which is in a bad communication state with the master battery processor 400, to be the passive mode (for example, the second mode). For example, the master battery processor 400 may determine the operation mode of the slave battery processor among the slave battery processors 300-1 to 300-*n*, to be the passive mode (for example, the second mode), wherein the slave battery processor transmits with a transmission signal strength less than the reference strength, transmits during a transmission period equal to or longer than the reference period, transmits with frequency of transmission equal to or less than the reference frequency, or does not transmit the battery information to the master battery processor 400 normally.

According to embodiments, the master battery processor 400 may determine the operation mode of the slave battery processor among the slave battery processors coupled to the batteries requiring balancing which is in a good communication state with the master battery processor 400, to be the active mode (for example, the first mode).

According to embodiments, the master battery processor 400 may determine the operation mode of the slave battery processor among the slave battery processors coupled to the batteries not requiring balancing which is in a bad communication state with the master battery processor 400, to be the passive mode (for example, the second mode).

According to embodiments of the present disclosure, the master battery processor 400 may determine, on the basis of the battery states of the batteries 500-1 to 500-*n*, the operation modes of the slave battery processors 300-1 to 300-*n* coupled thereto.

Figure 7:
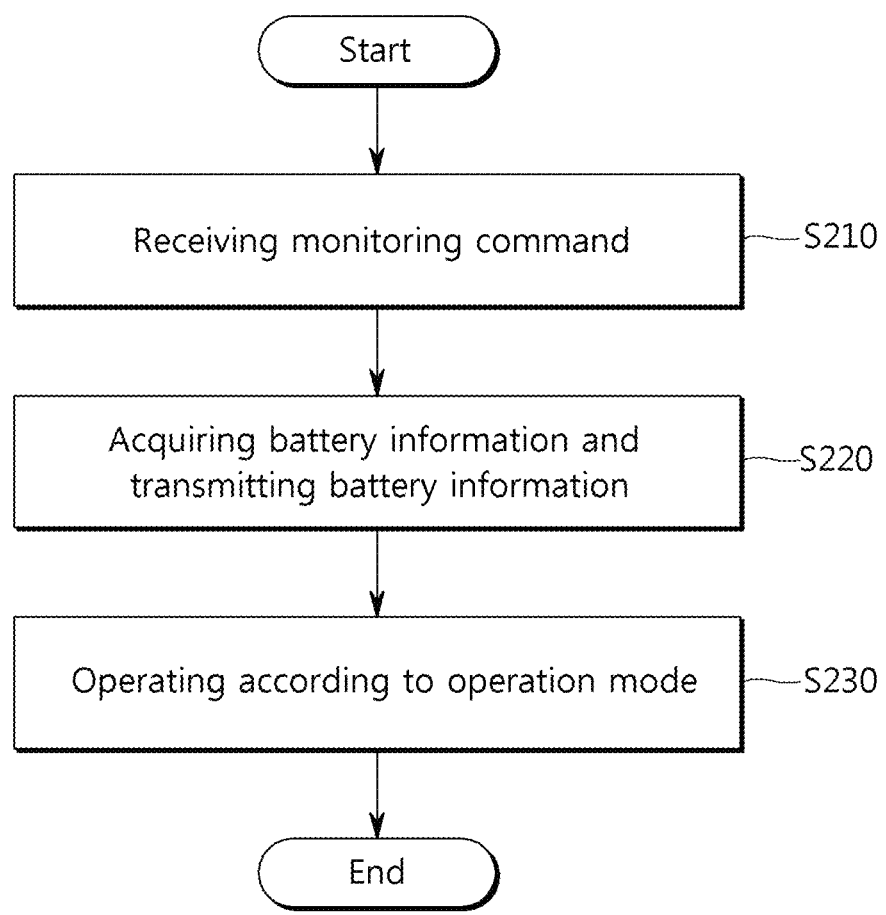
FIG. 7 is a flowchart showing a method of operating a slave battery processor according to embodiments of the present disclosure.

FIG. 7 is a flowchart showing a method of operating a slave battery processor according to embodiments of the present disclosure. The method shown in FIG. 7 may be performed by the slave battery processors 300-1 to 300-*n*. In addition, the method may be implemented by instructions executable by the slave battery processors 300-1 to 300-*n*. The instructions may be stored in a computer readable storage medium.

Referring to FIGS. 1 to 7, the slave battery processors 300-1 to 300-*n* may receive the monitoring commands at step S210. According to embodiments, the slave battery processors 300-1 to 300-*n* may receive the monitoring commands transmitted from the master battery processor 400.

According to embodiments, in the case where the monitoring commands are periodically transmitted from the master battery processor 400, each time a period ends, the slave battery processors 300-1 to 300-*n* may receive, from the master battery processor 400, the acknowledgements including the IDs of the slave battery processors in which transmission of the battery information is completed.

The slave battery processors 300-1 to 300-*n* may acquire the battery information from the batteries 500-1 to 500-*n* in response to the monitoring commands, and may transmit the battery information to the master battery processor 400 at step S220. According to embodiments, the slave battery processors 300-1 to 300-*n* may transmit the battery information and their IDs to the master battery processor 400.

The slave battery processors 300-1 to 300-*n* may operate according to the operation modes determined by the master battery processor 400, at step S230. According to embodiments, the slave battery processors 300-1 to 300-*n* may receive, from the master battery processor 400, the operation commands including information on the operation modes, and may consume, on the basis of the received operation commands, electric energy with which the batteries 500-1 to 500-*n* coupled to the slave battery processors 300-1 to 300-*n* are charged. For example, the first slave battery processor 300-1 may consume the electric energy stored in the first battery 300-1 in response to the operation command.

Each of the slave battery processors 300-1 to 300-*n* may operate according to any one among the first mode and the second mode. The slave battery processors 300-1 to 300-*n* may communicate with the master battery processor 400 at the higher participation rate or may consume more electric energy when operating in the first mode than when operating in the second mode.

According to embodiments, each of the slave battery processors 300-1 to 300-*n* may operate in any one among the active mode, the normal mode, or the passive mode. The communication participation rate in the active mode may be higher than the communication participation rate in the normal mode. The communication participation rate in the normal mode may be higher than the communication participation rate in the passive mode. In addition, according to embodiments, the electric energy consumed in the active mode may be greater than the power consumed in the normal mode. The electric energy consumed in the normal mode may be greater than the power consumed in the passive mode.

In the passive mode, the slave battery processors 300-1 to 300-*n* may enter an idle mode. Afterward, the slave battery processors 300-1 to 300-*n* may be woken up on the basis of a wake-up command transmitted from the master battery processor 400. According to embodiments, when the first slave battery processor 300-1 operates in the passive mode, the first slave battery processor 300-1 enters the idle mode. The first slave battery processor 300-1 entering the idle mode may no longer transmit the first battery information until the wake-up command is received. That is, the slave battery processor operating in the passive mode may not transmit the battery information even though the monitoring command is received.

In the normal mode, the slave battery processors 300-1 to 300-*n* may consume more electric energy than in the passive mode. According to embodiments, all the slave battery processors operating in the normal mode may consume the same electric energy. For example, in the case where the first slave battery processor 300-1 and the second slave battery processor 300-2 operate in the normal mode, the power of the first battery 500-1 consumed by the first slave battery processor 300-1 may be substantially the same as the power of the second battery 500-2 consumed by the second slave battery processor 300-2.

In the active mode, the slave battery processors 300-1 to 300-*n* may communicate with the master battery processor 400 at the higher communication participation rate than in the passive mode and the normal mode.

The slave battery processors operating in the active mode may transmit data to the master battery processor 400 with at least one among higher transmission strength, the greater number of times, and shorter intervals, than operating in the normal mode and the passive mode. The data may include the battery information.

The slave battery processors operating in the active mode may receive and store data transmitted from the slave battery processors except themselves. In addition, the slave battery processors operating in the active mode may transmit data received from the slave battery processors except themselves, to the master battery processor 400 instead (namely, a relay function).

According to embodiments, the slave battery processors 300-1 to 300-*n* may receive the acknowledgements transmitted from the master battery processor 400. As described above, the acknowledgement includes the ID of the slave battery processor (specifically, the slave battery processor transmitting the battery information received by the master battery processor 400) corresponding to the battery information received by the master battery processor 400. Herein, the slave battery processors operating in the active mode may receive and store the battery information transmitted from the slave battery processors except themselves, and may transmit the battery information that is not received by the master battery processor 400 among the pieces of the stored battery information, to the master battery processor 400. Herein, the slave battery processors operating in the active mode may transmit the battery information not received by the master battery processor 400, to the master battery processor 400 with the high transmission strength.

According to embodiments, the slave battery processors operating in the active mode may transmit, to the master battery processor 400, the battery information of the batteries coupled to the slave battery processors operating in the passive mode and the normal mode.

The slave battery processors operating in the active mode may periodically transmit synchronization signals. According to embodiments, when all the slave battery processors 300-1 to 300-*n* enter the idle mode (or a sleep mode), the slave battery processors operating in the active mode are periodically woken up and transmit synchronization signals.

In the active mode, the slave battery processors 300-1 to 300-n may use more power stored in the batteries or use the power quickly than in the passive mode and the normal mode. According to embodiments, the slave battery processors operating in the active mode may further use the energy stored in the battery, by using the resistor for balancing.

The operations of the slave battery processors in the active mode may be performed individually or in combination of two or more.

According to embodiments of the present disclosure, the slave battery processors 300-1 to 300-n may operate in various operation modes depending on the states of the batteries 500-1 to 500-n coupled thereto. The slave battery processors operating in the active mode may communicate with the master battery processor 400 at the high participation rate, resulting in the increase in reliability of communication.

Figure 8:
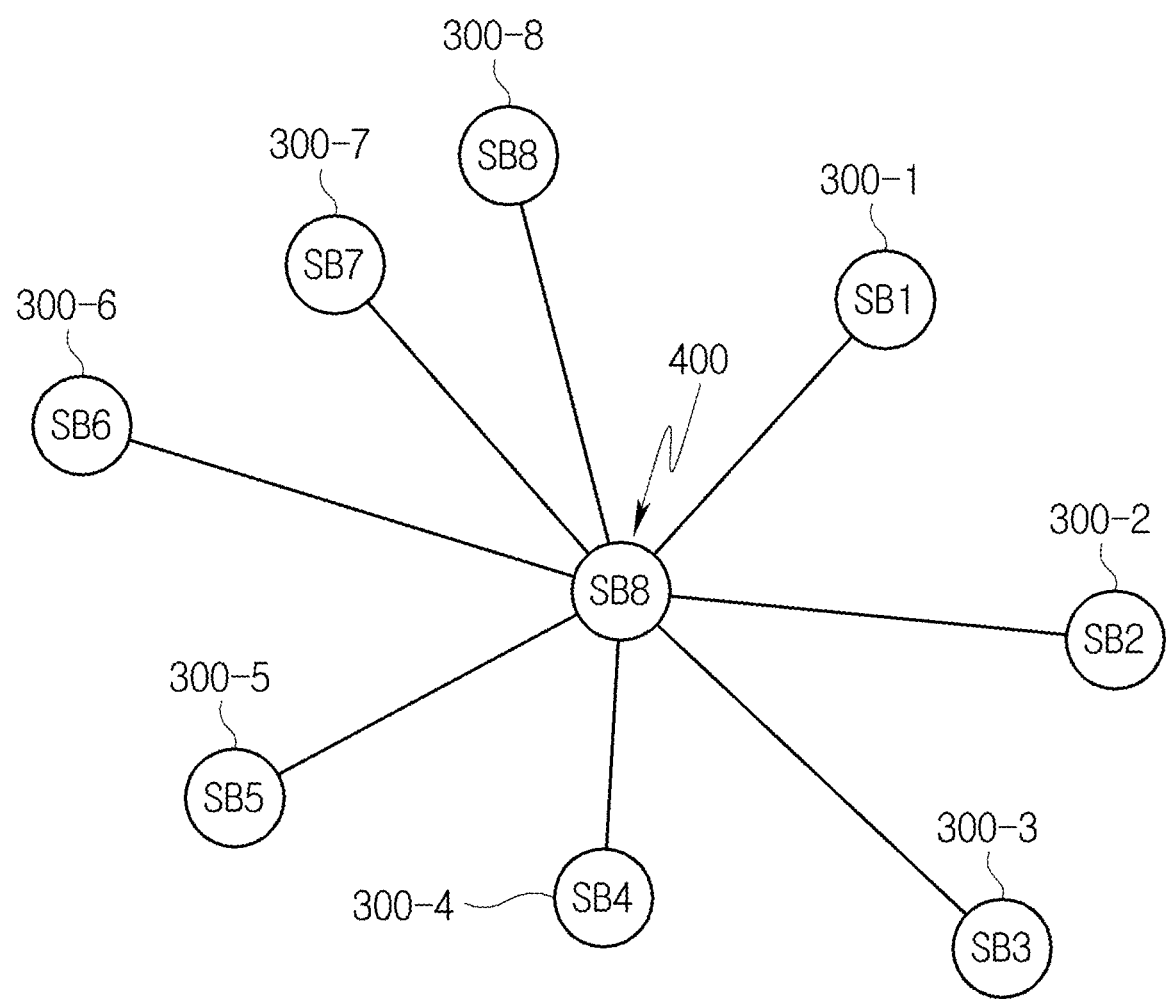
FIGS. 8 to 10 are views showing operations of a battery system according to embodiments of the present disclosure.
Figure 9:
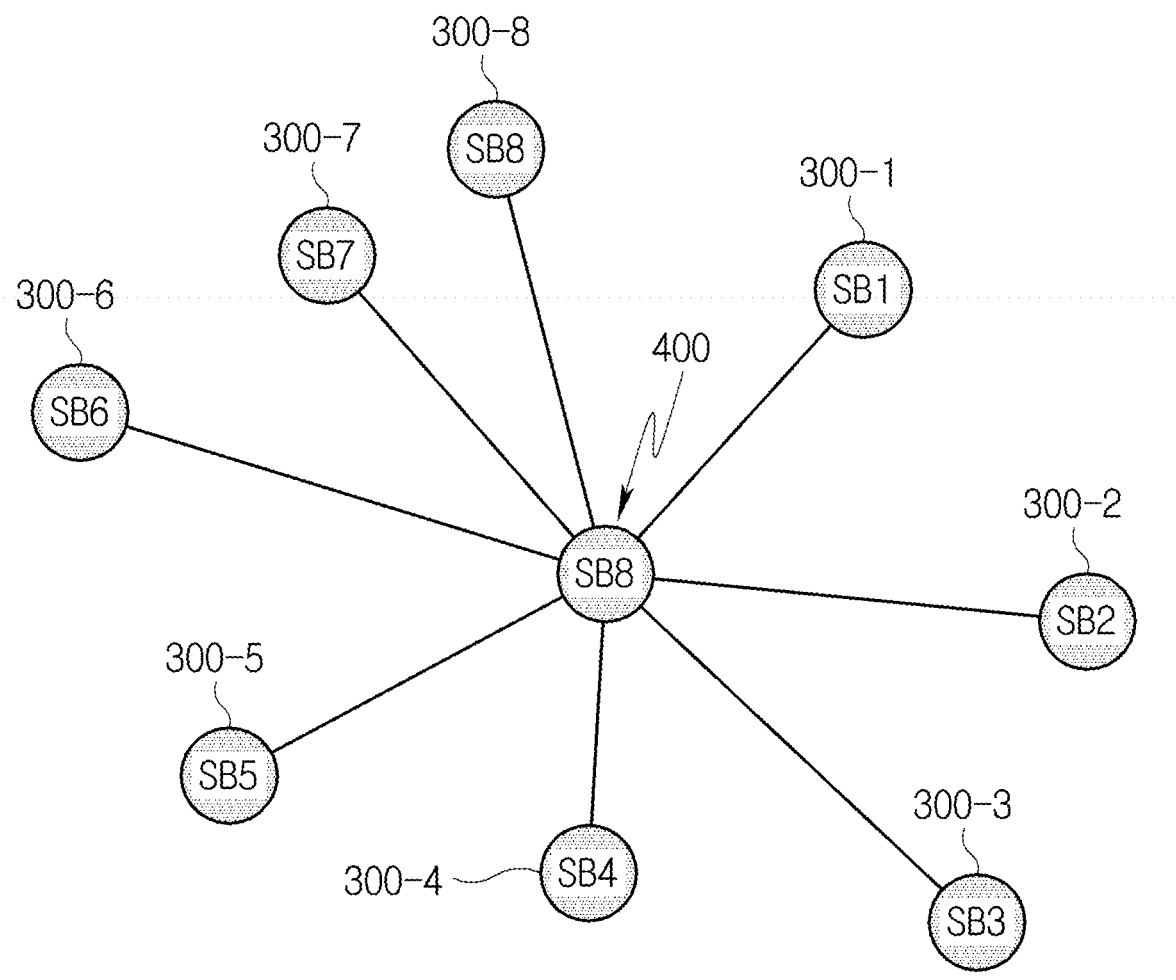
Figure 10:
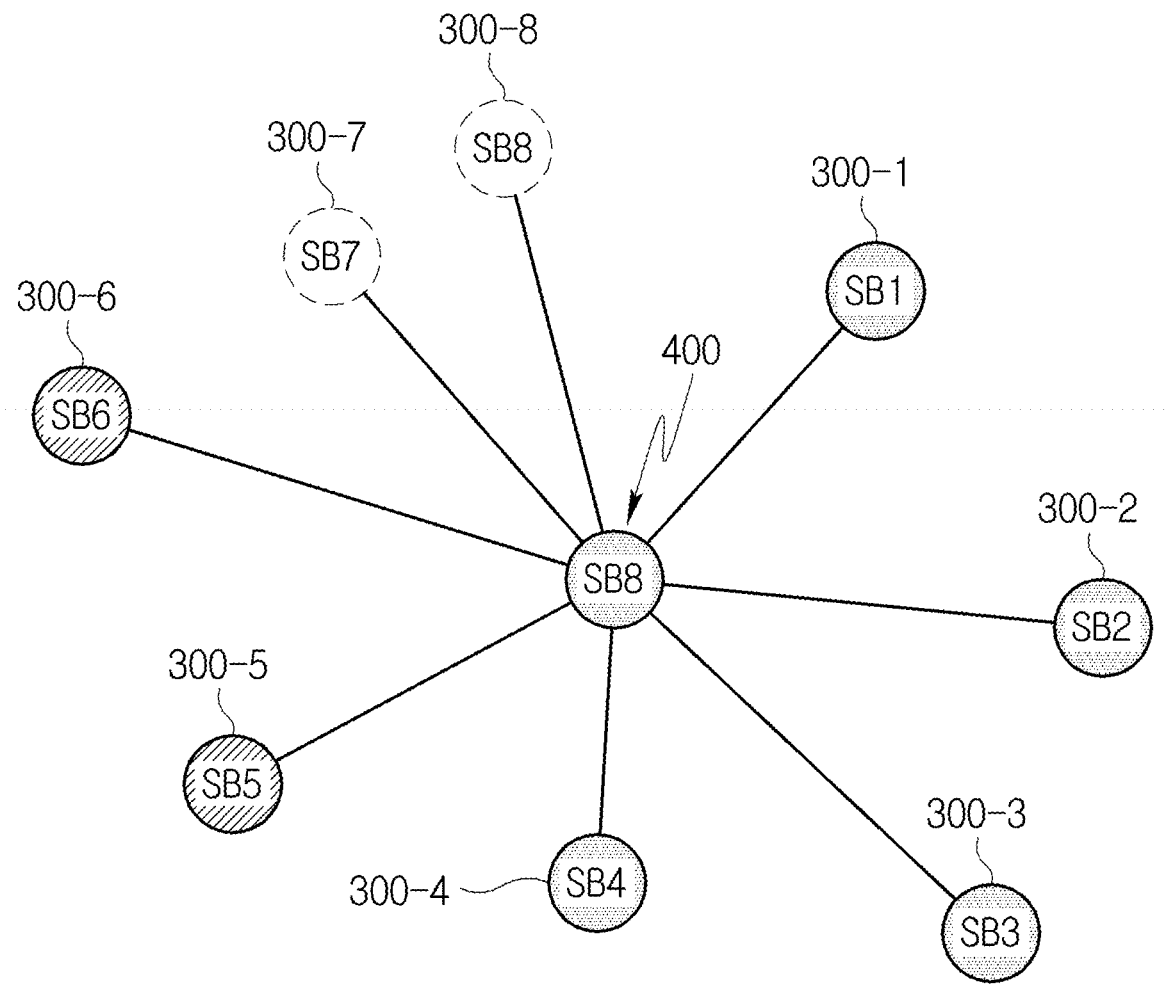

FIGS. 8 to 10 are views showing operations of a battery system according to embodiments of the present disclosure. Although eight slave battery processors 300-1 to 300-8 are shown in FIGS. 8 to 10, embodiments of the present disclosure are not limited thereto.

Referring to FIG. 8, the master battery processor 400 and the slave battery processors 300-1 to 300-8 may transmit and receive data from each other. According to embodiments, the master battery processor 400 may transmit the monitoring commands, and the slave battery processors 300-1 to 300-n may transmit the battery information of the batteries 500-1 to 500-n coupled thereto, to the master battery processor 400 in response to the monitoring commands. The master battery processor 400 may determine, on the basis of the battery information, the operation modes of the slave battery processors 300-1 to 300-8, and the slave battery processors 300-1 to 300-8 may operate according to the determined operation modes.

FIG. 9 shows that the slave battery processors 300-1 to 300-8 operate in the normal mode. All the slave battery processors 300-1 to 300-8 may consume the same electric energy in the normal mode. Accordingly, voltage change rates of the batteries 500-1 to 500-8 coupled thereto may be similar to each other.

FIG. 10 shows that the slave battery processors 300-1 to 300-8 operate in different modes according to the determination by the master battery processor 400. The first slave battery processor 300-1 to the fourth slave battery processor 300-4 operate in the normal mode; a fifth slave battery processor 300-5 and a sixth slave battery processor 300-6 operate in the active mode; and a seventh slave battery processor 300-7 and an eighth slave battery processor 300-8 operate in the passive mode.

According to embodiments, the batteries coupled to the seventh slave battery processor 300-7 and the eighth slave battery processor 300-8 that operate in the active mode may be the batteries requiring balancing. That is, the voltages of the battery coupled to the seventh slave battery processor 300-7 and the battery coupled to the eighth slave battery processor 300-8 may be relatively high.

According to embodiments, the seventh slave battery processor 300-7 and the eighth slave battery processor 300-8 operating in the active mode may be in a relatively good communication state with the master battery processor 400.

The master battery processor 400 may transmit the operation commands ordering the following: the first slave battery processor 300-1 to the fourth slave battery processor 300-4 operate in the normal mode; the fifth slave battery processor 300-5 and the sixth slave battery processor 300-6 operate in the active mode; and the seventh slave battery processor 300-7 and the eighth slave battery processor 300-8 operate in the passive mode. Each of the slave battery processors 300-1 to 300-8 may receive the operation command, and may operate in any one among the normal mode, the active mode, and the passive mode according to the operation command.

The seventh slave battery processor 300-7 and the eighth slave battery processor 300-8 operating in the passive mode may consume lower electric energy than the remaining slave battery processors 300-1 to 300-6 consume. According to embodiments, the seventh slave battery processor 300-7 and the eighth slave battery processor 300-8 operating in the passive mode may communicate with the master battery processor 400 at the lower communication participation rates than the remaining slave battery processors 300-1 to 300-6 communicate. For example, the seventh slave battery processor 300-7 and the eighth slave battery processor 300-8 operating in the passive mode may enter the idle mode, and may be woken up on the basis of the wake-up commands. According to embodiments, the seventh slave battery processor 300-7 and the eighth slave battery processor 300-8 enter the idle mode in response to the operation commands and thus may not participate in communication with the master battery processor 400 until being woken up.

The fifth slave battery processor 300-5 and the sixth slave battery processor 300-6 operating in the active mode may consume higher electric energy than the remaining slave battery processors 300-1 to 300-4, and 300-7 and 300-8 consume. According to embodiments, the fifth slave battery processor 300-5 and the sixth slave battery processor 300-6 operating in the active mode may communicate with the master battery processor 400 at the higher communication participation rates than the remaining slave battery processors 300-1 to 300-4, and 300-7 and 300-8 communicate.

For example, the fifth slave battery processor 300-5 and the sixth slave battery processor 300-6 operating in the active mode may transmit data to the master battery processor 400 with at least one among higher transmission strength, the greater number of times, and shorter intervals, than the remaining slave battery processors 300-1 to 300-4, and 300-7, and 300-8 transmit.

For example, the fifth slave battery processor 300-5 and the sixth slave battery processor 300-6 operating in the active mode may receive and store data transmitted from the remaining slave battery processors 300-1 to 300-4, and 300-7 and 300-8, and may transmit the stored data to the master battery processor 400 instead (namely, the relay function).

According to embodiments, the fifth slave battery processor 300-5 and the sixth slave battery processor 300-6 operating in the active mode may transmit, on the basis of the acknowledgements transmitted from the master battery processor 400, the battery information not received by the master battery processor 400, to the master battery processor 400. For example, the fifth slave battery processor 300-5 and the sixth slave battery processor 300-6 may transmit, to the master battery processor 400, the battery information corresponding to the seventh slave battery processor 300-7 and the eighth slave battery processor 300-8 operating in the passive mode.

According to embodiments, the fifth slave battery processor 300-5 and the sixth slave battery processor 300-6 operating in the active mode may periodically transmit synchronization signals.

As will be described later, according to embodiments of the present disclosure, the slave battery processor coupled to the battery requiring balancing is caused to operate at the high communication participation rate, thereby performing balancing through battery consumption and simultaneously enhancing the reliability of communication.

Figure 11:
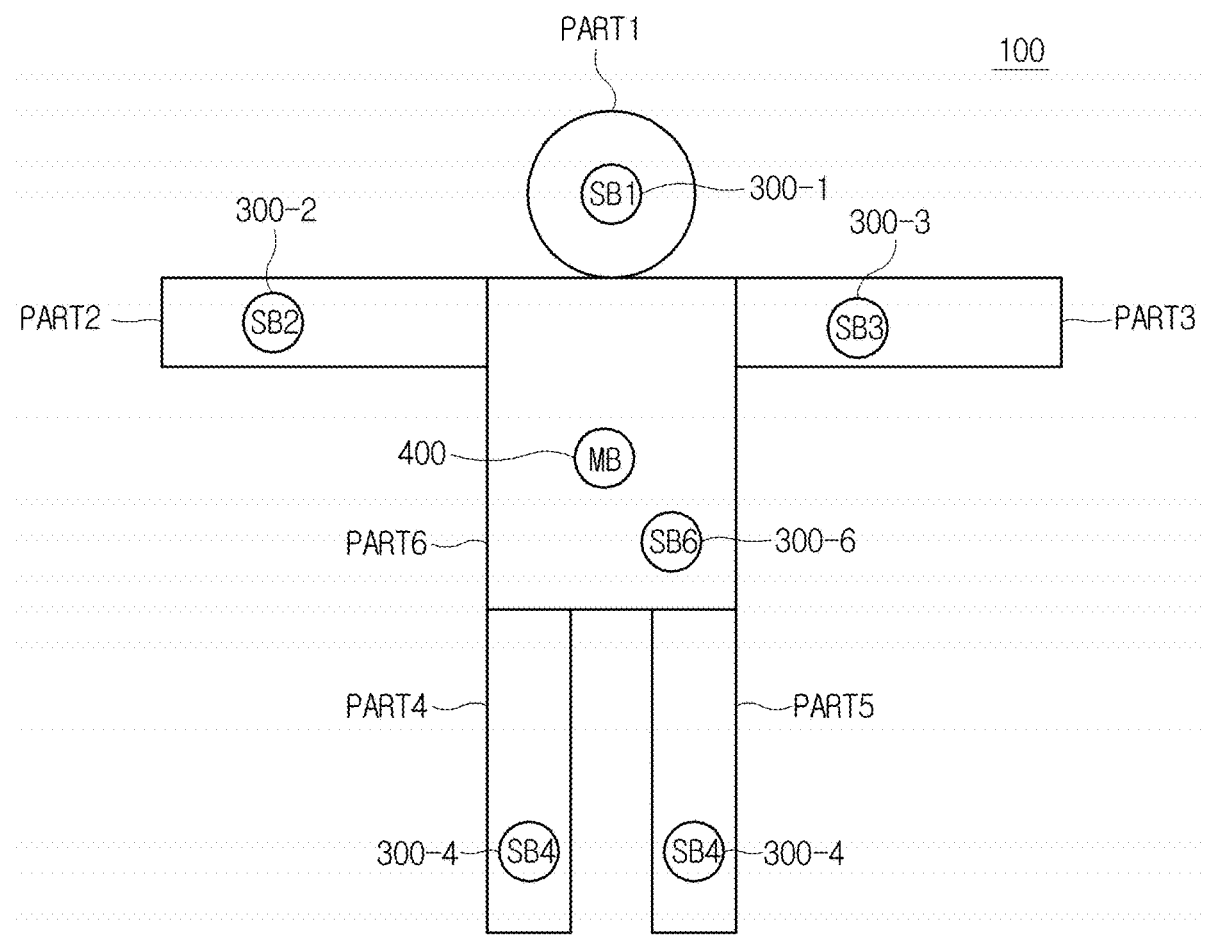
FIG. 11 is a view showing a robot according to embodiments of the present disclosure.

FIG. 11 is a view showing a robot according to embodiments of the present disclosure. A robot 100 shown in FIG. 11 may be the AI apparatus 100 described with reference to FIG. 1. Referring to FIGS. 1 to 11, the robot 100 may include multiple parts PART1 to PART6. The multiple parts PART1 to PART6 may be groups of elements of the robot 100 divided according to function or may be groups of elements of the robot 100 divided according to position, but they are not limited thereto. In the meantime, the batteries coupled to the slave battery processors 300-1 to 300-6 are omitted.

The multiple parts PART1 to PART6 may include respective battery processors. According to embodiments, a first part PART1 to a sixth part PART6 may include the first slave battery processor 300-1 to the sixth slave battery processors 300-6, respectively. Further, the sixth part PART6 may further include the master battery processor 400. According to embodiments, the batteries coupled to the slave battery processors 300-1 to 300-6 may be included in the same part as the respective slave battery processors 300-1 to 300-6 are included.

Although the sixth slave battery processor 300-6 and the master battery processor 400 are shown separately in FIG. 11, these may be integrated as one processor. Herein, the integrated processor may be the processor 180 shown in FIG. 1, but it is not limited thereto. That is, the battery system 20 according to embodiments of the present disclosure may be applied to the robot 100, and each of the battery processors of the battery system 20 may be included in each of the parts grouped according to function or position in the robot 100.

The battery processors 300-1 to 300-6 and 400 may control the batteries coupled thereto so as to supply the power required for operation of the robot 100. According to embodiments, the parts PART1 to PART6 may supply power respectively required from the battery processors 300-1 to 300-6 and 400 corresponding thereto. According to embodiments, the first slave battery processor 300-1 may control the battery coupled thereto so that the power is supplied to the first part PART1.

The battery processors 300-1 to 300-6 and 400 may transmit and receive data from each other. According to embodiments, the slave battery processors 300-1 to 300-6 may transmit the battery information to the master battery processor 400. In addition, the battery processors 300-1 to 300-6 and 400 may transmit and receive data on the respective parts PART1 to PART6 corresponding thereto, from each other. For example, the battery processors 300-1 to 300-6 and 400 may transmit and receive information on their positions, from each other.

The slave battery processors 300-1 to 300-6 and the master battery processor 400 may perform the functions and the operations described with reference to FIGS. 4 to 10. Accordingly, the reliability of communication between the battery processors 300-1 to 300-6 and 400 in the robot 100 may be enhanced.

The battery system 20 according to embodiments of the present disclosure may be applied to the robot 100. Since the battery system 20 includes the battery processors capable of communicating with each other, the batteries required for operation of the robot 100 may be distributed to the respective parts PART1 to PART6 of the robot 100, thereby securing stability of the center of gravity of the robot 100.

The control method of the robot or operation method of the processor according to embodiments of the present disclosure may be stored in a computer readable storage medium so as to be employed in commands executable by the processor.

The storage medium can include a database, including distributed database, such as a relational database, a non-relational database, an in-memory database, or other suitable databases, which can store data and allow access to such data via a storage controller, whether directly and/or indirectly, whether in a raw state, a formatted state, an organized stated, or any other accessible state. In addition, the storage medium can include any type of storage, such as a primary storage, a secondary storage, a tertiary storage, an off-line storage, a volatile storage, a non-volatile storage, a semiconductor storage, a magnetic storage, an optical storage, a flash storage, a hard disk drive storage, a floppy disk drive, a magnetic tape, or other suitable data storage medium.

Although some embodiments have been disclosed above, it should be understood that these embodiments are given by way of illustration only, and that various modifications, variations, and alterations can be made without departing from the spirit and scope of the present disclosure. Therefore, the scope of the present disclosure should be limited only by the accompanying claims and equivalents thereof.

Accordingly, the present disclosure has been made keeping in mind the above problems occurring in the related art, and the present disclosure is intended to provide a battery system including slave battery processors that communicate with a master battery processor at different communication participation rates according to modes determined on the basis of battery information.

According to embodiments of the present disclosure, there is provided a battery system including: a master battery processor configured to transmit monitoring commands; and slave battery processors configured to be coupled to batteries, and to transmit battery information of the batteries coupled thereto, to the master battery processor in response to the monitoring commands, wherein the master battery processor determines operation modes of the slave battery processors on the basis of the battery information transmitted from the slave battery processors, and the slave battery processors communicate with the master battery processor at different communication participation rates according to the determined operation modes.

According to embodiments of the present disclosure, there is provided a method of operating a battery system including a master battery processor and multiple slave battery processors, the method including: transmitting, by the master battery processor, monitoring commands; transmitting, by the slave battery processors, battery information of batteries coupled thereto, to the master battery processor in response to the monitoring commands; determining, by the master battery processor, operation modes of the slave battery processors on the basis of the transmitted battery information; and communicating, by the slave battery processors, with the master battery processor at different communication participation rates according to the determined operation modes.

According to embodiments of the present disclosure, there is provided a battery system including: a master battery processor configured to transmit monitoring commands; a first slave battery processor configured to be coupled to a first battery, and to transmit first battery information of the first battery to the master battery processor in response to the monitoring commands; and a second slave battery processor configured to be coupled to a second battery, and to transmit second battery information of the second battery to the master battery processor in response to the monitoring commands, wherein the master battery processor determines, on the basis of the first battery information and the second battery information, operation modes of first slave battery processor and the second slave battery processor, the first slave battery processor communicates with the master battery processor at first frequency according to the determined operation mode, and the second slave battery processor communicates with the master battery processor at second frequency according to the determined operation mode.

According to embodiments of the present disclosure, a computer program for performing a method of operating a battery system may be stored in a computer-readable storage medium.

According to embodiments of the present disclosure, the slave battery processors can perform communication with the master battery processor at different communication participation rates on the basis of the battery information, thereby enhancing reliability of communication.

It will be understood that when an element or layer is referred to as being "on" another element or layer, the element or layer can be directly on another element or layer or intervening elements or layers. In contrast, when an element is referred to as being "directly on" another element or layer, there are no intervening elements or layers present. As used herein, the term "and/or" includes any and all combinations of one or more of the associated listed items.

It will be understood that, although the terms first, second, third, etc., may be used herein to describe various elements, components, regions, layers and/or sections, these elements, components, regions, layers and/or sections should not be limited by these terms. These terms are only used to distinguish one element, component, region, layer or section from another region, layer or section. Thus, a first element, component, region, layer or section could be termed a second element, component, region, layer or section without departing from the teachings of the present invention.

Spatially relative terms, such as "lower", "upper" and the like, may be used herein for ease of description to describe the relationship of one element or feature to another element(s) or feature(s) as illustrated in the figures. It will be understood that the spatially relative terms are intended to encompass different orientations of the device in use or operation, in addition to the orientation depicted in the figures. For example, if the device in the figures is turned over, elements described as "lower" relative to other elements or features would then be oriented "upper" relative to the other elements or features. Thus, the exemplary term "lower" can encompass both an orientation of above and below. The device may be otherwise oriented (rotated 90 degrees or at other orientations) and the spatially relative descriptors used herein interpreted accordingly.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Embodiments of the disclosure are described herein with reference to cross-section illustrations that are schematic illustrations of idealized embodiments (and intermediate structures) of the disclosure. As such, variations from the shapes of the illustrations as a result, for example, of manufacturing techniques and/or tolerances, are to be expected. Thus, embodiments of the disclosure should not be construed as limited to the particular shapes of regions illustrated herein but are to include deviations in shapes that result, for example, from manufacturing.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Any reference in this specification to "one embodiment," "an embodiment," "example embodiment," etc., means that a particular feature, structure, or characteristic described in connection with the embodiment is included in at least one embodiment of the invention. The appearances of such phrases in various places in the specification are not necessarily all referring to the same embodiment. Further, when a particular feature, structure, or characteristic is described in connection with any embodiment, it is submitted that it is within the purview of one skilled in the art to effect such feature, structure, or characteristic in connection with other ones of the embodiments.

Although embodiments have been described with reference to a number of illustrative embodiments thereof, it should be understood that numerous other modifications and embodiments can be devised by those skilled in the art that will fall within the spirit and scope of the principles of this disclosure. More particularly, various variations and modifications are possible in the component parts and/or arrangements of the subject combination arrangement within the scope of the disclosure, the drawings and the appended claims. In addition to variations and modifications in the component parts and/or arrangements, alternative uses will also be apparent to those skilled in the art.

What is claimed is:

1. A battery system comprising:
a master battery processor configured to transmit monitoring commands; and
a plurality of slave battery processors to couple to a plurality of batteries, and configured to transmit, to the master battery processor, battery information of the plurality of batteries, in response to the monitoring commands,
wherein the master battery processor is configured to determine operation modes of the plurality of slave battery processors based on the battery information transmitted from the plurality of slave battery processors, and
each of the plurality of slave battery processors communicates with the master battery processor with transmission strength corresponding to an operation mode determined for each of the plurality of slave battery processors,
wherein each of the operation modes corresponds to different transmission strengths.

2. The battery system of claim 1, wherein the master battery processor is configured to determine, based on the battery information, the operation modes of each of the plurality of slave battery processors to separately be one of a first mode or a second mode, and
communication with the master battery processor is to be performed at a higher communication participation rate when one of the plurality of slave battery processors is operating in the first mode as compared to when the one of the plurality of slave battery processors is operating in the second mode.

3. The battery system of claim 2, wherein the one of the plurality of slave battery processors is to transmit the battery information to the master battery processor with higher transmission strength when the one of the plurality of slave battery processors is operating in the first mode as compared to when the one of the plurality of slave battery processors is operating in the second mode.

4. The battery system of claim 2, wherein the one of the plurality of slave battery processors is to transmit the battery information to the master battery processor a greater number of times when the one of the plurality of slave battery processors is operating in the first mode as compared to when the one of the plurality of slave battery processors is operating in the second mode.

5. The battery system of claim 2, wherein when the one of the plurality of slave battery processors is operating in the first mode, the one of the plurality of slave battery processors is to receive the battery information transmitted from the other of the plurality of plurality of slave battery processors, and to store the received battery information, and
when the one of the plurality of slave battery processors is operating in the first mode, the one of the plurality of slave battery processors is to transmit, based on acknowledgements, the battery information among pieces of the stored battery information which is not received by the master battery processor, to the master battery processor.

6. The battery system of claim 2, wherein the master battery processor is configured to determine, based on the battery information, an operation mode of one of the plurality of slave battery processors coupled to a battery for balancing, to be the first mode.

7. The battery system of claim 2, wherein the master battery processor is configured to determine an operation mode of the one of the plurality of slave battery processors coupled to a battery for balancing which is in a good communication state, to be the first mode.

8. The battery system of claim 2, wherein when another one of the plurality of slave battery processors is operating in the second mode, the another one of the plurality of slave battery processors is to enter an idle mode and not communicate with the master battery processor until a wake-up signal is received.

9. The battery system of claim 1, wherein the plurality of slave battery processors are to wirelessly communicate with the master battery processor.

10. The battery system of claim 1, wherein the battery information includes state information of one of the plurality of batteries.

11. A method of operating a battery system that includes a master battery processor and a plurality of slave battery processors, the method comprising:
transmitting, by the master battery processor, monitoring commands to the plurality of slave battery processors;
transmitting, by the plurality of slave battery processors, battery information of batteries coupled to the plurality of slave battery processors, to the master battery processor in response to the monitoring commands;
determining, by the master battery processor, operation modes of the plurality of slave battery processors based on the transmitted battery information; and
communicating, by the plurality of slave battery processors, with the master battery processor at different communication participation rates according to the determined operation mode,
wherein communicating with the master battery processor comprises communicating, by each of the plurality of slave battery processors, with the master battery processor with transmission strength corresponding to an operation mode determined for each of the plurality of slave battery processors, and
wherein each of the operation modes corresponds to different transmission strengths.

12. The method of claim 11, wherein the determining of the operation modes of the plurality of slave battery processors includes:
determining, by the master battery processor based on the battery information, the operation modes of each of the plurality of slave battery processors to separately be one of a first mode or a second mode,
wherein one of the plurality of slave battery processors is to communicate with the master battery processor at a higher communication participation rate when the one of the plurality of slave battery processors is operating in the first mode as compared to when the one of the plurality of slave battery processors is operating in the second mode.

13. The method of claim 12, wherein the communicating with the master battery processor, includes:
transmitting, by the one of the plurality of slave battery processors, the battery information to the master battery processor with at least one of a higher transmission strength or a greater number of times, when the one of the plurality of slave battery processors is operating in the first mode as compared to when the one of the plurality of slave battery processors is operating in the second mode.

14. The method of claim 12, wherein the communicating with the master battery processor, includes:
receiving, by the one of the plurality of slave battery processors when operating in the first mode, the battery information transmitted from other ones of the plurality of slave battery processors;
storing the received battery information; and
transmitting the stored battery information to the master battery processor.

15. The method of claim 12, wherein the determining of the operation modes of the plurality of slave battery processors includes:
determining, by the master battery processor based on the battery information, an operation mode of one of the plurality of slave battery processors coupled to the battery for balancing, to be the first mode.

16. The method of claim 11, wherein the communicating includes the plurality of slave battery processors wirelessly communicating with the master battery processor.

17. A battery system comprising:
a master battery processor configured to transmit monitoring commands;
a first slave battery processor configured to be coupled to a first battery, and to transmit first battery information of the first battery to the master battery processor in response to one of the monitoring commands; and
a second slave battery processor configured to be coupled to a second battery, and to transmit second battery information of the second battery to the master battery processor in response to one of the monitoring commands, wherein the master battery processor is configured to determine an operational mode of the first slave battery processor based on the first battery information, and to determine an operation mode of the second slave battery processor based on the second battery information, the first slave battery processor is to communicate with the master battery processor at first transmission strength according to the determined operation mode of the first slave battery processor, and the second slave battery processor is to communicate with the master battery processor at second transmission strength according to the determined operation mode of the second slave battery processor.

18. The battery system of claim 17, wherein the first battery has a higher voltage than the second battery, and the first transmission strength is greater than the second transmission strength.

19. The battery system of claim 18, wherein the first slave battery processor is to receive data transmitted from the second slave battery processor, and the first slave battery processor is to transmit the received data to the master battery processor.

20. The battery system of claim 17, wherein the first slave battery processor is to wirelessly communicate with the master battery processor, and the second slave battery processor is to wirelessly communicate with the master battery processor.

\* \* \* \* \*